Dec. 29, 1942.　　　　F. E. HAND　　　　2,306,725
TRACTOR MOUNTED IMPLEMENT
Filed May 29, 1941　　　2 Sheets-Sheet 1
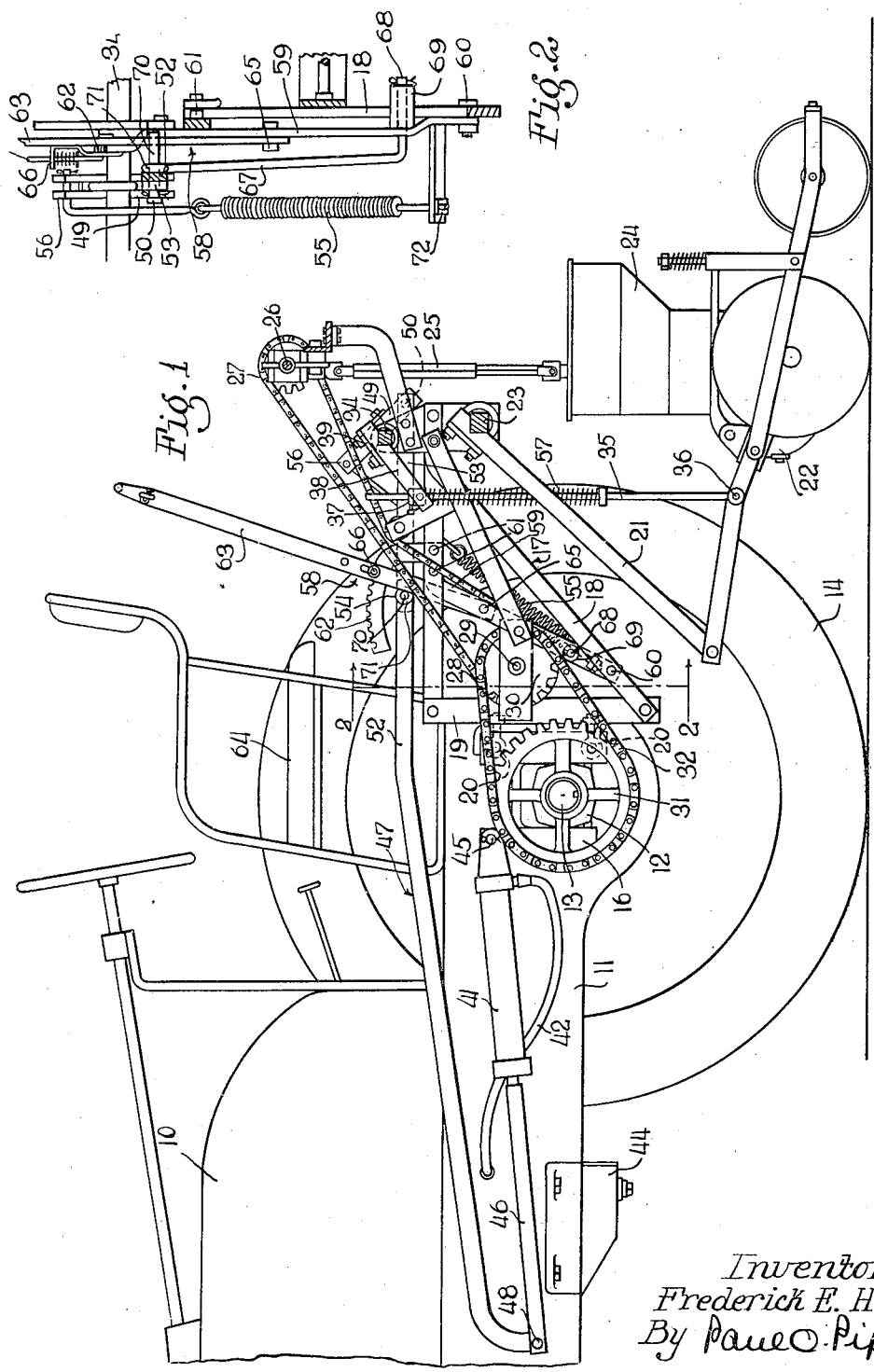
Inventor
Frederick E. Hand
By Paul O. Pippel
Atty.

Dec. 29, 1942.   F. E. HAND   2,306,725
TRACTOR MOUNTED IMPLEMENT
Filed May 29, 1941   2 Sheets-Sheet 2

Inventor
Frederick E. Hand
By Paul O. Pippel
Atty

Patented Dec. 29, 1942

2,306,725

UNITED STATES PATENT OFFICE 2,306,725

TRACTOR-MOUNTED IMPLEMENT

Frederick E. Hand, Canton, Ill., assignor to International Harvester Company, a corporation of New Jersey Application May 29, 1941, Serial No. 395,778

5 Claims. (Cl. 97—50)

This invention relates to tractor-mounted implements and more particularly to an attachment for converting a tractor-mounted implement of a type not having a manual adjusting means into an implement of a type not having a manual adjusting means into an implement wherein a manual adjustment means is provided.

It is an object of the present invention to provide a manual adjusting means adapted to be disposed in the lifting connections of a tractor-mounted implement, wherein the working tool forming a part of the implement may be adjusted or varied in one of its positions.

It is another object of the invention to provide on the bracket structure serving as a support for the manual adjusting means, means for supporting the link connections connected between the lifting means and the working tool.

According to the present invention, the manual adjusting means is carried on a bracket structure, and the bracket structure is so located on the tool-supporting structure as to be in close proximity to the lifting connections between the lifting source and the working tool. This structure is in the form of an attachment adapted for connection to the frame-supporting structure of a tractor-mounted implement or attachment. This adjustable means is adaptable for attachment to an implement of the type disclosed in the pending application Serial No. 248,860, filed Dec. 31, 1938, in the name William S. Graham and Frederick E. Hand. The adjusting means takes the form of an adjustable stop carried by the bracket structure, and this adjustable stop, when connected to the tool attachment, is arranged to cooperate with the link connections between the lifting source and the working tool. The link connections have an abutment thereon which lies in the path of the adjustable stop means. The attachment also serves as a support for the link connections by providing a pivotable link or movable means which connects with the link connections at their union with one another. A removable pin means is connected between the upper end of the link-supporting structure and the link connections, and this pin means extends laterally a sufficient distance to serve as an abutment means on the link connection. The pivotal link is fastened to the bracket structure by means of a sleeve into which there extends the laterally extending end of the link member, whereby the link connections will be retained or stabilized against lateral movement.

For other objects and for a better understanding of the invention, reference may be had to the following detailed description taken in conjunction with the accompanying drawings, in which:

Figure 1 is a view in elevation of the rear portion of the tractor with one of its drive wheels removed and of a tool attachment embodying the adapted device forming the feature of the present invention;

Figure 2 is a detail view in elevation taken along the line 2—2 of Figure 1 and looking in the direction of the arrows thereof; and, Figure 3 is a plan view of the rear portion of the tractor and of the working tool attachment and of the adapted device associated therewith.

Figure 3:
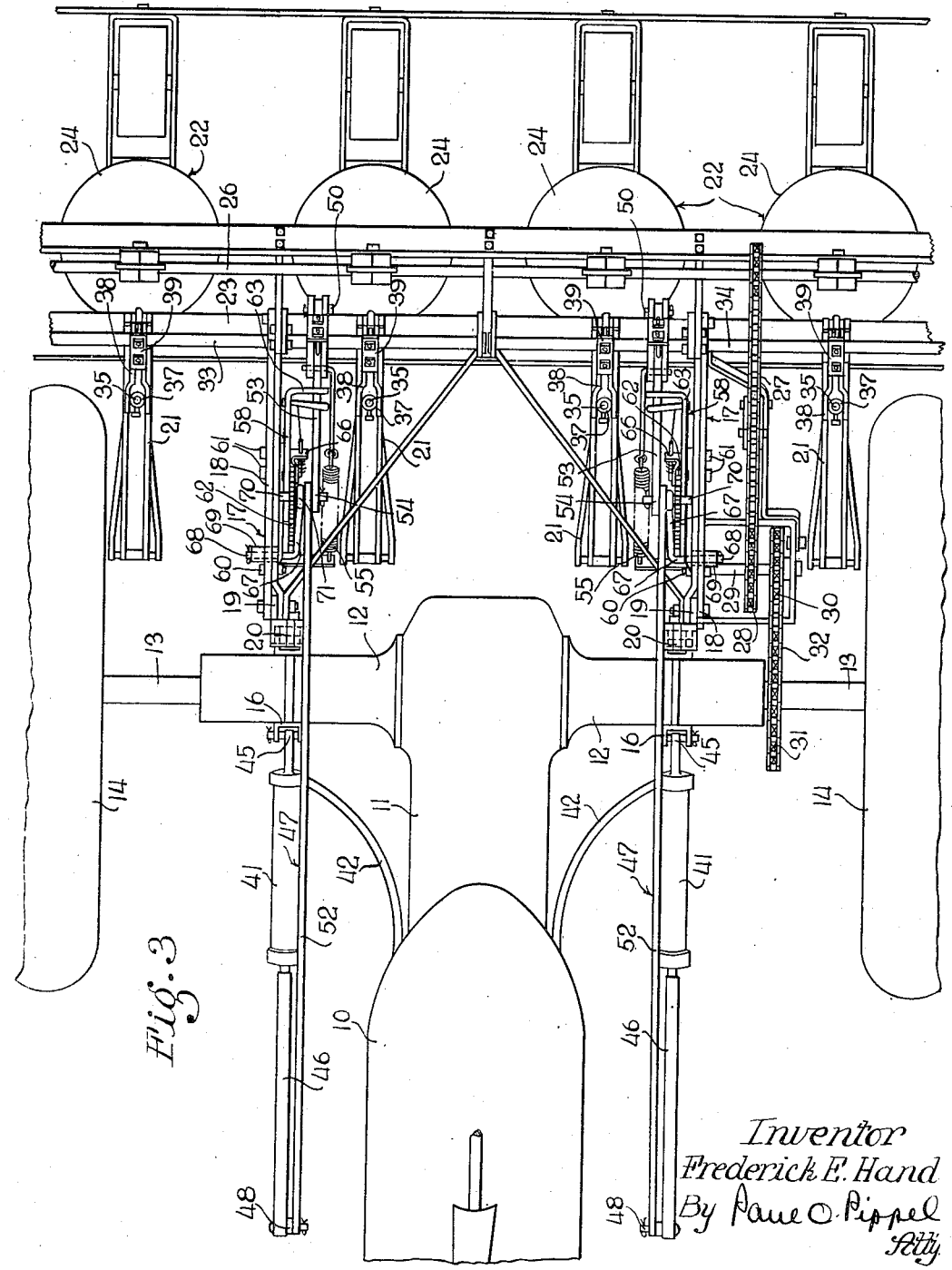

Referring now to the drawings, there is shown a tractor 10 having a body portion 11 which includes a rear axle structure 12 having a rear axle 13 therein for driving the tractor drive wheels 14. On the rear axle structure and at opposite sides of the tractor is provided the usual attaching means 16 for connection to the tractor of a working tool attachment 17. The working tool attachment 17 includes a rearwardly extending supporting structure 18 having vertically extending elements 19 adapted to be connected to the tractor-attaching means 16 and there retained by the swingable attaching bolts 20 forming part of the tractor-attaching means 16. Connected to the rearward end of the supporting structure 18 and extending forwardly and downwardly is a bracket element 21 to the forward end of which is pivotally connected a working tool 22, the working tool 22 having free vertical movement, and there is provided respectively at transversely spaced locations a plurality of these working tools 22. This is made possible by providing on the supporting frame 18 a transversely extending tool bar 23 to which the bracket elements 21 may be attached at any location along its length. The working tools, herein shown, are of a type adapted to plant seed and including a hopper structure 24 with parts therein adapted to be driven by a vertically extending driving means 25 connected with a transversely extending drive mechanism 26 carried on the supporting frame 18. This drive mechanism 26 is driven by a flexible drive means 27 connected to a sprocket 28 on an auxiliary drive shaft 29. This drive shaft 29 has a sprocket 30 which is connected with a main drive sprocket 31 on the axle 13, by means of a chain drive 32. When it is desired to detach the planting attachment from the tractor, it is only necessary that the chain drive 32 be disconnected. The auxiliary drive shaft and its associated sprockets will remain on the working tool attachment.

Also extending laterally on a supporting frame

18 are two rockable lifting structures 33 and 34. The rockable structure 33 is located at the right side of the tractor for connection with the working tools 22 located at that side thereof. The shaft 34 is located at the left side of the tractor and is connected with the working tools 22 located at the left side of the tractor. The connection with the working tools is respectively made by means of lift rods 35 connected with the tools, as indicated at 36, and connected at their upper ends by means of a trunnion 37 pivoted on the forwardly extending end of an arm 38 rigidly fastened to the transverse shafts by the clamping means 39. It should now be apparent that by the provision of separate rockable structures there may be located at the respective sides of the tractor the means for operating the respective rockable structures independently of each other. The following description will, therefore, be directed to but one of the means for operating the rockable structure at one side of the tractor, but it should be understood that a numerical designation may clearly apply to the means for locating the shaft at the opposite side of the tractor.

Connected to the attaching means 16 and extending forwardly is a fluid operable device 41 arranged to receive fluid through a hose connection 42 from a fluid pressure source 44 lying partly within the body portion 11 of the tractor. This fluid cylinder device 41 is anchored to the attaching means 16, as indicated at 45, and its piston rod means 46 is thrust forwardly upon fluid pressure being received from the fluid source 44. The piston rod means is connected to the rockable structure 34 by the link connections 47 connected to the piston rod means, as indicated at 48, and to the rockable structure 34 by means of a rearwardly extending arm 49 rigidly attached to the rockable structure 34. Connection with the arm 49 is made as indicated at 50, and these link connections 47 include two link elements 52 and 53 adapted to buckle with respect to each other at its hinge connection joint 54. Since the fluid cylinder device 41 is of the single acting type which is only actuated by the fluid to move the working tool vertically, it becomes necessary that some means be provided to maintain the working tools downwardly and in their ground-working position. This is effected by a spring means 55 connected to an upwardly extending arm 56 on the rockable structure 34. As the rockable structure 34 is rocked in a clockwise direction, the effective length of the arm 56 is lessened whereby the spring 55 becomes less effective upon the working tools being withdrawn from their working position. The lift rods 35 for each of the individual working tools has a pressure spring means 57 adapted to act upon the individual working tools.

Coming now more particularly to the features of the present invention, there is provided an attachment, indicated generally at 58, which can be connected to the supporting structure 18, one at each side of the tractor, which when so located will provide the working tool attachment with a means for adjusting the working depth of the working tools. These attachments include a bracket structure 59 taking the form of a vertically extending strap adapted to serve as a means for the connection of the attachment to the tool supporting structure. The bracket 59 is connected to the tool-supporting structure, as indicated at 60 and 61, the upper end of the vertically extending strap being provided with a rearwardly extending portion which runs continuously with the upper part of the supporting structure 18 and upwardly to provide on its upper end a quadrant portion 62. Over this quadrant 62 there is operated an adjusting lever 63 accessible to the operator's station 64 on the rear axle structure of the tractor. The adjusting lever is pivoted, as indicated at 65, to the intermediate portion of the vertically extending strap 59. The lever has thereon a latch mechanism 66 for connection with the quadrant 62.

To provide means for supporting the link connection 47 to prevent the same from buckling downwardly, there is provided a movable supporting link means 67 having a laterally extending portion 68 adapted to be journaled in a laterally extending sleeve 69 carried by the bracket 59. The movable link means is connected with the union of the elements 52 and 53 by means of a removable pin 70 extending laterally through the link elements 52 and 53 and through an eye portion 71 formed on the upper end of the movable link means 67. This pin 70 extends laterally a sufficient distance to lie in the path of the adjusting lever 63. The link connections 47 will thus be maintained against downward collapse due to the tendency of the same to buckle and against lateral movement by means of the elongated sleeve 69 in which the portion of the link 68 is pivoted. The spring means 55 may likewise be connected to the bracket 59, as indicated at 72.

It should now be apparent that there has been provided a means for converting the tool attachment into an attachment having the manually adjustable stop means for varying the working depth of the working tools 22, and that this attachment is of such form that the same may be readily connected to and carried by the supporting frame structure serving as a means for the connecting of the working tools to the tractor. The adjusting lever 63 may be located at any position along the quadrant 62 and as the link connections 47 move rearwardly, they will be retained in a rearward position by the lever 63. Also, it should be apparent that there has been provided by the attachment itself means for the supporting of the link connections to maintain the abutment on the same in its proper location with respect to the lever 63 so that the lever 63 may at all times serve as a means for stopping the rearward movement of the link connections 47.

While various changes may be made in the detail construction of the attachment, it shall be understood that such changes shall be within the spirit and scope of the present invention as defined by the appended claims.

What is claimed is:

1. In combination, a tool-supporting structure, a working tool connected to the tool-supporting structure for vertical movement to and from its working position, means for lifting the working tool from its working position and including horizontally extending buckling link connections, an adapter device for providing an adjustment for the working tool including a bracket structure adapted for attachment to the tool-supporting structure, an adjustable stop means carried by the bracket structure and adapted to cooperate with the buckling link connections to limit their longitudinal movement in one direction, and a supporting link on the bracket structure for the buckling link connections to maintain the same in proximity to the adjustable stop means.

2. In combination, a tool-supporting structure, a working tool connected to the tool-supporting structure for vertical movement to and from its working position, means for lifting the working tool from its working position and including horizontally extending buckling link connections and an adapter device for providing an adjustment for the working tool including a bracket structure adapted for attachment to the tool-supporting structure, an adjustable stop means carried by the bracket structure, and means fastened to the bracket structure for supporting the buckling link connections, the connection of the supporting means with the buckling link connections serving as an abutment on the link connections for cooperation with the adjustable stop means.

3. In combination, a tool-supporting structure, a working tool connected to the tool-supporting structure for vertical movement to and from its working position, means for lifting the working tool from its working position and including horizontally extending buckling link connections, an adapter device for providing an adjustment for the working tool including a bracket structure adapted for attachment to the tool-supporting structure, an adjustable stop means carried by the bracket structure and adapted to cooperate with the link connections, and means fastened to the bracket structure for supporting the link connections at their pivotal intersection with each other.

4. In combination, a tool-supporting structure, a working tool connected to the tool-supporting structure for vertical movement to and from its working position, means for lifting the working tool from its working position and including horizontally extending buckling link connections, an adapter device for providing an adjustment for the working tool including a bracket structure adapted for attachment to the tool-supporting structure, an adjustable stop means carried by the bracket structure and adapted to cooperate with the link connections, means fastened to the bracket structure for supporting the link connections at their pivotal intersection with each other, removable pin means extending between the supporting means and the link connections, and said pin means serving as an abutment on the link connections adapted for cooperation with the adjustable stop means.

5. In combination, a tool-supporting structure, a working tool connected to the tool-supporting structure for vertical movement to and from its working position, means for lifting the working tool from its working position and including horizontally extending buckling link connections, an adapter device for providing an adjustment for the working tool including a bracket structure adapted for attachment to the tool-supporting structure, and adjustable stop means carried by the bracket structure and adapted to cooperate with the buckling link connections to limit their longitudinal movement in one direction, and a supporting link on the bracket structure for retaining the same against downward buckling movement, and said link being connected to the bracket structure for pivotal movement by means restraining the same against lateral movement, whereby said link connections are stabilized against downward collapse as well as against lateral movement.

FREDERICK E. HAND.